United States Patent
Lavrentovich et al.

(10) Patent No.: US 9,690,161 B2
(45) Date of Patent: Jun. 27, 2017

(54) FIELD INDUCED HELICONICAL STRUCTURE OF CHOLESTERIC LIQUID CRYSTAL

(71) Applicant: Kent State University, Kent, OH (US)

(72) Inventors: Oleg D. Lavrentovich, Kent, OH (US); Sergij V. Shiyanovsii, Stow, OH (US); Jie Xiang, Kent, OH (US); Young-Ki Kim, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 14/812,397

(22) Filed: Jul. 29, 2015

(65) Prior Publication Data

US 2016/0033806 A1 Feb. 4, 2016

Related U.S. Application Data

(60) Provisional application No. 62/030,819, filed on Jul. 30, 2014.

(51) Int. Cl.
| | |
|---|---|
| *G02F 1/137* | (2006.01) |
| *G02F 1/1343* | (2006.01) |
| *C09K 19/02* | (2006.01) |
| *C09K 19/58* | (2006.01) |

(Continued)

(52) U.S. Cl.
CPC ...... *G02F 1/13718* (2013.01); *C09K 19/0208* (2013.01); *C09K 19/586* (2013.01); *C09K 2019/0444* (2013.01); *C09K 2019/122* (2013.01); *C09K 2019/123* (2013.01); *G02F 2001/134381* (2013.01)

(58) Field of Classification Search
CPC . G02B 5/18; G02F 1/292; G02F 2001/13478; G02F 2201/305; C09K 19/586; C09K 19/0208; C09K 2019/0444; C09K 2019/122; C09K 2019/123
See application file for complete search history.

(56) References Cited

U.S. PATENT DOCUMENTS

2005/0002101 A1* 1/2005 Kim .................. G02F 1/01
359/573

OTHER PUBLICATIONS

Cestari et al., Phase behavior and properties of the liquid-crystal dimer 1,7-bis(4-cyanobiphenyl-4-yl) heptane: A twist-bend nematic liquid crystal, Physical review E 84, 031704, 2011.*

(Continued)

*Primary Examiner* — Shean C Wu
(74) *Attorney, Agent, or Firm* — Fay Sharpe LLP

(57) ABSTRACT

A diffraction grating comprises a liquid crystal (LC) cell configured to apply an electric field through a cholesteric LC material that induces the cholesteric LC material into a heliconical state with an oblique helicoid director. The applied electric field produces diffracted light from the cholesteric LC material within the visible, infrared or ultraviolet. The axis of the heliconical state is in the plane of the liquid crystal cell or perpendicular to the plane, depending on the application. A color tuning device operates with a similar heliconical state liquid crystal material but with the heliconical director axis oriented perpendicular to the plane of the cell. A power generator varies the strength of the applied electric field to adjust the wavelength of light reflected from the cholesteric liquid crystal material within the visible, infrared or ultraviolet.

20 Claims, 9 Drawing Sheets

(51) Int. Cl.
C09K 19/04 (2006.01)
C09K 19/12 (2006.01)

(56) References Cited

OTHER PUBLICATIONS

Copic, "Nematic phase of achiral dimers spontaneously bends and twists", PNAS 110(40) 15855-15856, 2013.*
Xiang, et al., "Electrically Tunable Selective Reflection of Light from Ultraviolet to Visible and Infrared by Heliconical Cholesterics," Advanced Materials, vol. 27, pp. 3014-3018 (2015).
Chen, et al., "Chiral heliconical ground state of nanoscale pitch in a nematic liquid crystal of achiral molecular dimers," PNAS, vol. 110, No. 40, pp. 15931-15936 (2013).
Shribak, et al., "Techniques for fast and sensitive measurements of two-dimensional birefringence distributions," Applied Optics, vol. 42, No. 16, pp. 3009-3017 (2003).
Adlem, et al., "Chemically induced twist-bend nematic liquid crystals, liquid crystal dimers, and negative elastic constants," American Physical Society, Physical Review E88, pp. 022503-1-022503-8 (2013).
Balachandran, et al., "Elastic properties of bimesogenic liquid crystals," Liquid Crystals, vol. 40, No. 5, pp. 681-688 (2013).
Borshch, et al., "Nematic twist-bend phase with nanoscale modulation of molecular orientation," Nature Communications, 4:2635, pp. 1-8 (2013).
De Gennes, "Calcul De La Distorsion D'une Structure Cholesterique Par Un Champ Magnetique," Solid State Communications, vol. 6, pp. 163-165 (1968).
Xiang, et al., "Electrooptic Response of Chiral Nematic Liquid Crystals with Oblique Helicoidal Director," Physical Review Letters, PRL 112, pp. 217801-1-217801-5 (2014).
Meyer, "Effects of Electric and Magnetic Fields on the Structure of Cholesteric Liquid Crystals," Applied Physics Letters, vol. 12, No. 9, pp. 281-282 (1968).

* cited by examiner

FIELD INDUCED HELICONICAL STRUCTURE OF CHOLESTERIC LIQUID CRYSTAL

This application claims the benefit of U.S. Provisional Application No. 62/030,819 filed Jul. 30, 2014 and titled "Field Induced Heliconical Structure of Cholesteric Liquid Crystal". U.S. Provisional Application No. 62/030,819 filed Jul. 30, 2014 and titled "Field Induced Heliconical Structure of Cholesteric Liquid Crystal" is hereby incorporated by reference in its entirety into the specification of this application.

This invention was made with Government support under grant/contract no. DE-FG02-06ER 46331 awarded by the United States Department of Energy (DOE) and DMR 1121288 awarded by the National Science Foundation. The Government of the United States has certain rights in this invention.

BACKGROUND

The following generally relates to liquid crystal (LC) devices and methods for applications such as, but is not limited to, LC electro-optical devices, smart windows, displays, tunable diffraction gratings, color filters, light deflectors and scatterers, wide-angle beam steerers, and the like.

A state matter called nematic liquid crystal (LC) is defined by an orientationally ordered fluid having an average orientation of nematic molecules described by a so-called director ($\hat{n}$). The best known and most widely used nematic LC material in modern LC display applications is the uniaxial nematic LC. In uniaxial nematic LCs, rod-like achiral molecules are aligned along a single straight axis which serves as the director. If some or all of these nematic molecules are chiral instead of achiral, this director will twist in space and thus follow a right-angle helix. This twisting of the director results in a structure of nematic molecules referred to as either chiral nematic (N*) or cholesteric LC state.

Chiral nematics are highly promising for active photonic applications, e.g., for use in displays, tunable lasers, energy-conserving windows, and tunable color filters. This is due, in part, to the selective reflection of N* and their self-organized right-angle helical director field. The selective reflection is a manifestation of the periodic helical organization of the cholesteric phase. When macroscopically organized in the Grandjean texture (uniform standing helix), the chiral nematic satisfies the condition for a reflection of light as defined by the Bragg Equation. For light propagating parallel to the helical axis, the central wavelength of the reflection bandgap is defined as: $\lambda_p = \bar{n}P$, where P is the pitch length of the helical twist of the director and $\bar{n}$ is the average refractive index of the liquid crystal. Assuming a constant pitch, the reflection bandwidth of N* is defined by $\Delta\lambda = \Delta nP$, where $\Delta n$ is the birefringence of the LC.

The reflection color and reflectivity of N* can be controlled by a variety of stimuli including electric field, heat, and light. The field-induced modification of the helix of the N* material is typically performed by one of two ways: (1) changing the pitch of the helix, e.g., such as in diffractive element applications, or (2) realigning the helix axis as the whole, e.g., as used in bistable displays. In both of these methods, the fundamental character of the helical twist remains intact.

However, direct application of an electric field to cholesteric LCs to control the reflected color presents many problems. Once the electric field is applied, the periodic structure of N* becomes distorted in a non-uniform manner and induces an non-uniform coloration and reflectivity. In the case of an electric field applied parallel to the helix axis, the main reason for the disruption of the N* periodic structure is out-of-plane rotation of the helix from the uniform planar state to the disordered focal conic state. Unwinding of the helix using an electric field perpendicular to the helix axis can lead to a change in the wavelength of the reflection band, but such an approach requires fringe-fields which locally distort the homogeneity of the structure. Helfrich deformation, comprising undulations of common director orientation planes parallel to the substrates, has also been shown to provide a means of change the reflection color within a narrow tuning range, in which the local tilting of helix leads to shortening of pitch under the normal incidence. However, the undulations lead to spatial inhomogeneity of the pitch causing a broadening of the reflection band and decrease in the reflectance level.

BRIEF DESCRIPTION

In some illustrative embodiments disclosed herein, a diffraction grating device comprises a liquid crystal (LC) cell including two substrates, a liquid crystal material disposed within the liquid crystal cell between the substrates, and two electrodes, the electrodes disposed on the substrates and configured to apply an electric field through the chiral nematic disposed within the LC cell. A power generator is included for generating the applied electric field, the power generator configured to vary the strength of the applied electric field to produce a diffracted light from the cholesteric liquid crystal material within the visible spectrum. The applied electric field induces the oblique helicoidal director of the chiral nematic, the heliconical state $N_{oh}^*$.

In other illustrative embodiments disclosed herein, a device for color tuning comprises a LC cell including two substrates, a liquid crystal material disposed within the liquid crystal cell between the substrates, and two electrodes, the electrodes disposed on the substrates and configured to apply an electric field through the chiral nematic disposed within the LC cell. A power generator is included for generating the applied electric field, the power generator configured to vary the strength of the applied electric field to produce a reflected light from the cholesteric liquid crystal material within the visible spectrum. The applied electric field transform the chiral nematic material into a heliconical state $N_{oh}^*$ characterized by an oblique helicoidal director.

A method for controlling color in electrically induced state $N_{oh}^*$ of a chiral nematic, comprises providing chiral nematic materials in which the bend elastic constant $K_3$ is much smaller than the twist constant $K_2$. An electric field is applied to N* at a threshold field value $E_{NC}$ to induce a heliconical state $N_{oh}^*$ in which the director forms an oblique helicoid. A light is propagated onto the LC materials and a Bragg reflected light is produced within the visible light spectrum having a first wavelength. The applied electric field is decreased, wherein the Bragg reflected light is within the visible spectrum and has a second wavelength that is longer than the first wavelength.

In yet other illustrative embodiments disclosed herein, an electrooptic device comprises: a liquid crystal cell including spaced apart substrates defining a gap between the substrates and electrodes having one of (i) an in-plane geometry generating an electric field parallel with the substrates and (ii) a top-down geometry generating an electric field across the gap between the two spaced apart substrates; and a liquid crystal material disposed in the gap between the substrates and comprising a chiral nematic material formed by a mixture of molecular dimers and chiral dopant. The liquid crystal within an operational range of electric field applied by the electrodes exhibits an $N_{oh}^*$ state with an oblique angle helicoid director whose helicoid axis is oriented parallel with the electric field and whose helicoid pitch is sized to provide diffraction or Bragg reflection of light in a spectral range of interest impinging on one of the substrates of the liquid crystal cell.

BRIEF DESCRIPTION OF THE DRAWINGS

FIG. 4 (a)-(c) are taken under a polarizing optical microscope. FIG. 4(a) represents electric-field induced unwound nematic with the director parallel to the electric field. FIG. 4(b) represents heliconical state with the director following an oblique helicoid with the axis along the electric field. FIG. 4(c) represents right-angle helicoid state of the cholesteric. All scale bars in the micrographs are 50 μm. FIG. 4(d) is a graph of the first order diffraction angle of the heliconical state as a function of the applied electric field. FIG. 4(e) is a graph of the optical phase retardance as a function of the applied electric field in the vicinity of the transition from the unwound nematic to the heliconical state.

FIG. 9(a) shows an applied field profile with 50 kHz modulated square wave, and (b) the corresponding light transmittance from the applied field profile of FIG. 9(a). FIG. 9(c) shows the turn on and FIG. 9(d) turn off-response times between base heliconical state ($C_1$) and higher field heliconical state ($C_n$).

DETAILED DESCRIPTION

Figure 1:
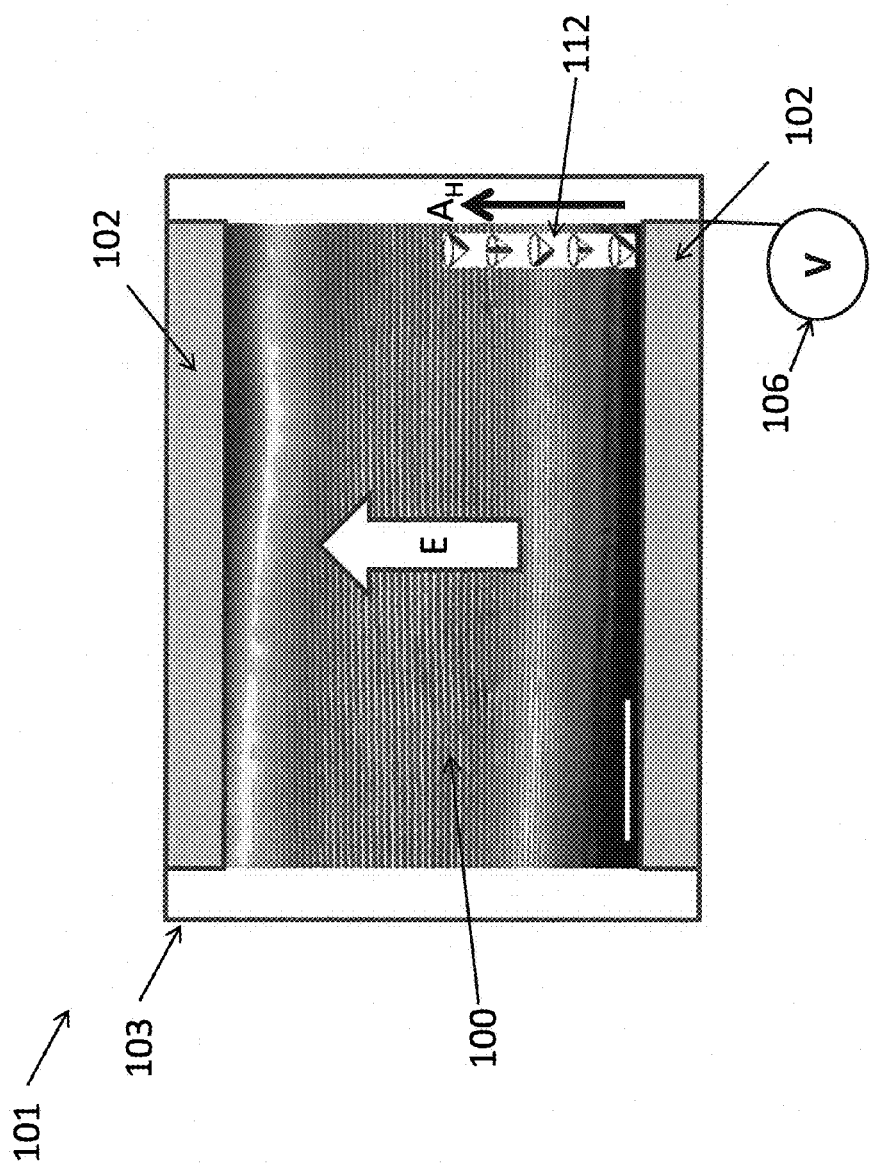
FIG. 1 is an illustration of a plan view of a device for electrically induced diffraction grating according to an exemplary embodiment.

The above noted problems can be solved by a very distinct mode of electrically induced deformation of N*. This electrically induced deformation produces a state with the director forming an oblique angle helicoid as opposed to a right angle helicoid. This state of the chiral nematic is denoted herein as $N_{oh}^*$, where the subscript "oh" derives from the "oblique helicoid" may also be referred to as the "heliconical" state.

The devices and methods disclosed herein provide electrical control of colored reflections within chiral nematic (N*) materials with an oblique helicoid director. Applications of the described approaches include, but are not limited to, diffraction grating and color tuning applications.

In various embodiments, the present disclosure provides methods and devices for electric control of chiral nematics N* with oblique angle helicoid, the state labelled as $N_{oh}^*$. As disclosed herein, the problems associated with direct coupling of the electric field and the ground state right-helicoid structure of N* can be overcome by electrically induced deformation of N* to produce a state $N_{oh}^*$ with an oblique angle helicoid director and with a pitch and cone angle that both depend on the applied electric field.

The described methods and devices generally allow for electrical tuning of the Bragg reflection from N* within the full visible spectrum with a narrow width of the reflection peak. In the ground field-free (or low field) state, the director is in the conventional chiral nematic N* state. An (increased) applied electric field directed perpendicular to the helix direction of the N* material causes a state change in which the director transforms to the $N_{oh}^*$ state to form an oblique helicoid with its helix direction oriented parallel with the applied electric field, with both the pitch and cone angle of the $N_{oh}^*$ controlled by the field. The color change is a result of the pitch change of the heliconical structure $N_{oh}^*$ with the helix axis oriented along the direction of the electric field. This electrically induced deformation approach can be applied to devices and methods to feature a broad color tunable range, a narrow reflection bandwidth and millisecond switching times. This broad range color switching of heliconical structure in chiral nematics could be used in applications such as reflection displays, color filters, and tunable LC lasers.

The $N_{oh}^*$ state has been theoretically predicted for a material in which the bend elastic constant $K_3$ is much smaller than the twist constant $K_2$. See R. B. Meyer, Applied Physics Letters 12, 281 (1968); P. G. de Gennes, Solid State Communications 6, 163 (1968); J. Xiang, S. V. Shiyanovskii, C. Imrie, and O. D. Lavrentovich, Physical Review Letters 112, 217801 (2014). This condition is not satisfied in typical nematics formed by rod-like molecules.

The devices disclosed herein operate in conjunction with N* material formed by molecular dimers in mixture with chiral dopant. Other materials formed by non-dimeric molecules, are also possible for the disclosed devices, as long as their response to the applied external electric field results in formation of the oblique helicoidal state $N_{oh}^*$. The molecular dimers, in which the flexible aliphatic chain links two rigid rod-like arms, exhibit a nematic state with an anomalously small value of $K_3$. See K. Adlem et al., Physical Review E 88, 022503 (2013); V. Borshch et al., Nature Communications 4, 2635 (2013); R. Balachandran, V. Panov, J. Vij, A. Kocot, M. Tamba, A. Kohlmeier, and G.

Mehl, Liquid Crystals 40, 681 (2013). As disclosed herein, a mixture of molecular dimers with chiral dopant when subjected to appropriate electric field may transform from the conventional chiral nematic N* state with its helix axis perpendicular to the electric field to an $N_{oh}^*$ state in which the director forms an oblique helicoid with its axis oriented parallel with the applied electric field and with a helicoidal period in a useful range, e.g. suitable for performing diffraction or Bragg reflection of light in the visible, infrared, and/or ultraviolet range. This $N_{oh}^*$ material with oblique heliconical director may be used in numerous practical applications, e.g. color tuning and diffraction grating, as the pitch and cone angle of the oblique heliconical director both depend on the applied electric field.

According to one embodiment, $N_{oh}^*$ material with heliconical director are used in a device 100 to implement a tunable diffraction grating. With reference to FIG. 1, a plan view is shown of liquid crystal material 100 in an LC cell 101 which includes one or more electrodes 102 employed in an in-plane geometry, that is, to produce an electric field E in the plane of the LC cell 101. In-plane means that the electrodes 102 apply an electric field E oriented in-plane with the bounding plates or substrates (such as glass plates 103) and the largest lateral surfaces of the liquid crystal (LC) slab 100 sandwiched between the glass plates 103. A voltage source or other electrical power generator 106 connected to the one or more electrodes 102 controls the strength of the electric field E applied to the LC material 100 through the one or more electrodes 102.

The LC cell 101 may be a flat glass cell with a thickness d (that is, separation between the plates 103) between 10-20 µm. (As just noted, FIG. 1 shows a plan view of the device 100; there are two plates 103 forming the flat glass cell, but only the top plate is visible in the plan view shown in FIG. 1). The electrodes 102 may be formed adjacent glass substrates 103 and be furthermore coated with a polyimide (not shown), e.g., PI2555, that sets a homeotropic (perpendicular) orientation of nematic molecules in the LC materials 100. When the cell 101 is filled with liquid crystal material 100 biased to have a helicoid director 112, an axis $A_H$ of the helicoid director 112 (see inset at lower left of the LC cell 101) is in a first plane of the cell 101. In this LC cell geometry, the periodic structure of both the heliconical director 112 achieved at a sufficiently high electric field, and the standard right-angle helical director of the cholesteric structure achieved at lower (or no) electric field, lie in the plane of the LC cell 101. To assure a uniform alignment of the helicoid director 112, the polyimide coatings on the substrates may be rubbed unidirectionally along a first axis of the first plane. The helicoid director 112 varies laterally across the cell between the electrodes 102 so as to produce a diffraction grating whose period depends upon the period of the helicoid director 112, which in turn is controlled by the electric field E (or, equivalently, by the voltage applied by voltage source 106). An electrically tunable diffraction grating is thus achieved for light impinging on the substrate 103.

Figure 2:
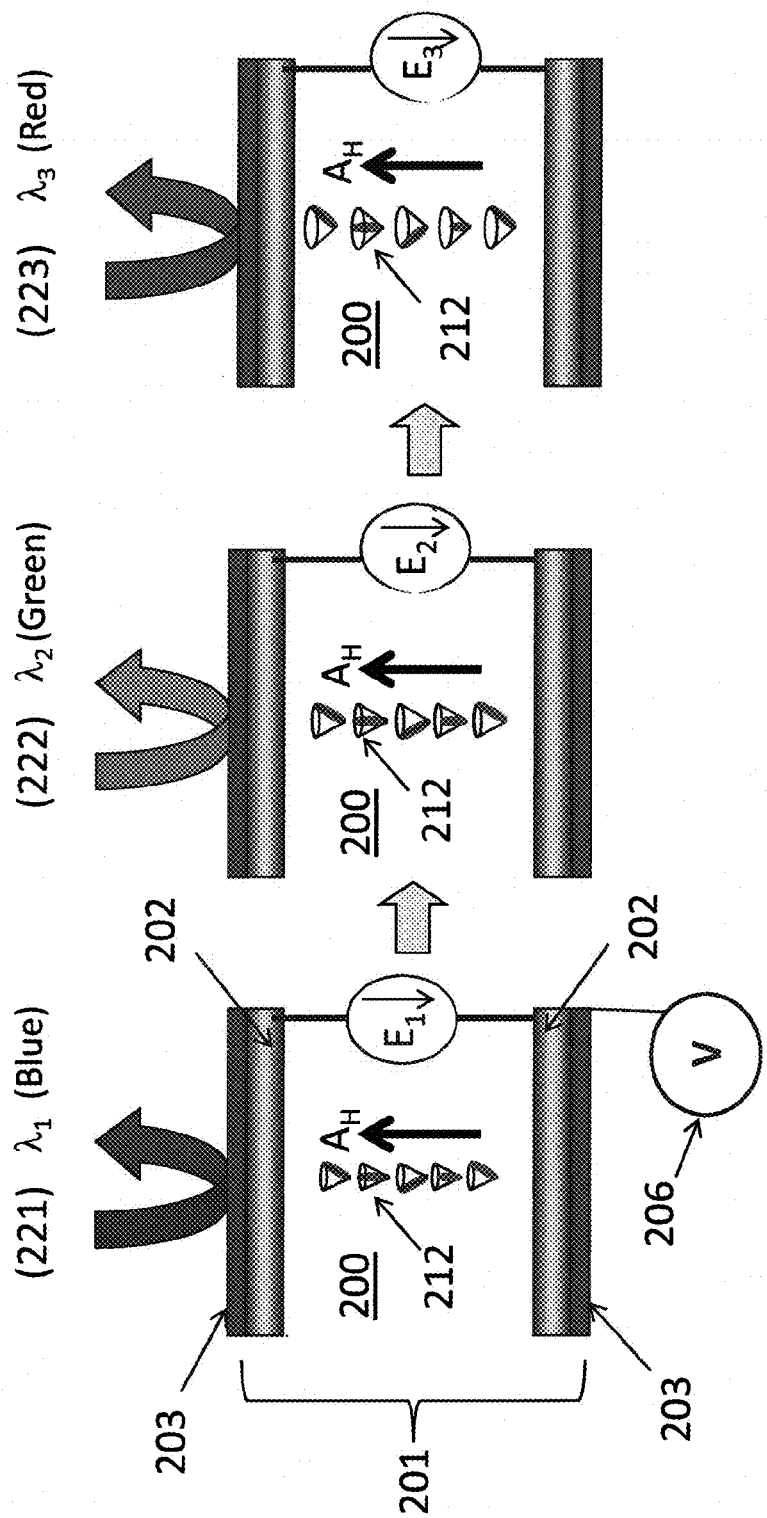
FIG. 2 is an illustration of a side sectional view of a device implementing a Bragg reflector for electrically induced color tuning according to an exemplary embodiment.

According to a second embodiment, which provides a tunable Bragg reflector, liquid crystal material with oblique heliconical director in the state $N_{oh}^*$ are used in a device 200 for electrically induced color tuning. With reference to FIG. 2, a liquid crystal material 200 is disposed in an LC cell 201 that includes one or more electrodes 202 which are employed in a top-down geometry. Top-down means that the electrodes 202 apply the electric field E across the LC cell 201 (that is, across the gap between the two spaced apart substrates 203) rather than in the plane of the device. In the left, middle, and right diagrams of FIG. 2, the electric field E applied to the liquid crystal material 200 is represented as $E_1$, $E_2$, and $E_3$, where $E_1$-$E_3$ decrease in electric strength respectively and may in one illustrative embodiment range between 3.5 V/µm and 2.8 V/µm. These voltages are in the range where the liquid crystal material 200 is in the $N_{oh}^*$ state. The minimum and maximum voltage limits of the stability of the $N_{oh}^*$ state depend on the material's chemical composition and can be tuned by a selection of appropriate compounds and dopants. The numbers above refer to only one embodiment of the invention and in no way limit the invention in terms of the voltage range. The electrodes 202 may be formed adjacent glass substrates 203 and be furthermore coated with a polyimide (not shown), e.g., PI2555, that sets a homeotropic (perpendicular) orientation of nematic molecules in the LC materials 210. When the cell 201 is filled with the LC material 200 and biased to have the illustrated helicoid director 212, the axis $A_H$ of the helicoid director 212 is oriented along the direction of the electric field E which is transverse to the substrates 203. A voltage source or other power generator 206 connected to the one or more electrodes 202 controls the strength of the electric field $E_1$, $E_2$, $E_3$ applied to the LC materials 210 through the one or more electrodes 202.

The shift of the electric field over the range $E_1$, $E_2$, $E_3$ induces a shift in the wavelength of the reflected light 221, 222, 223 within the visible spectrum by using the field-induced heliconical state of $N_{oh}^*$ with the helicoid axis $A_H$ of the director 212 parallel to the applied electric field $E_1$, $E_2$, $E_3$. The wavelength λ of reflected light is given by Bragg's law, which for normal incidence on the substrate 203 is $\Delta=2P/n$ where P is the period of the helicoid director 212 and n is the effective refractive index. Adjusting the electric field strength within the range for which the LC material 200 is in the $N_{oh}^*$ state adjusts the period of the heliconical director 212 along its vertical axis, and hence tunes the reflection wavelength λ. In one embodiment, $E_1$ is approximately 3.4 V/µm and reflected light 221 appears blue in color, $E_2$ is approximately 3.1 V/µm and reflected light 222 appears green in color, and $E_3$ is approximately 2.8 W/µm and reflected light 223 appears red in color. The wavelength $\lambda_1$, $\lambda_2$, $\lambda_3$ of the reflected light 221, 221, 223 may be tuned within the full visible spectrum, e.g. approximately between 400 nm and 700 nm, with a narrow width of the reflection peak occurring around 30 nm. The response time between switching colors of the reflected light 221, 222, 223 is in the millisecond range.

In general, the disclosed electrooptic devices include LC material 100, 200 comprising chiral nematic material formed by a mixture of molecular dimers and chiral dopant, which within an operational range of applied electric field exhibit an $N_{oh}^*$ state with an oblique angle helicoid director whose helicoid axis $A_H$ is oriented parallel with the electric field and with electric field-dependent helicoid pitch and cone angle. The choice of materials is not limited by the set of molecular dimers, as any other type of chemical structure of the liquid crystal that produces the oblique helicoidal state under the action of the external field can be used in the disclosed devices. The helicoid pitch over the operational range of applied electric field is effective to provide Bragg reflection and/or optical diffraction of light in a spectral range of interest. Typically, in applications such as displays, the spectral range of interest is visible spectrum or a portion thereof. However, the proposed approach is not limited by the visible part of the spectrum, and is operational in the ultraviolet and infrared regions as well. For example, as shown in FIG. 5a, the heliconical pitch can vary in the range of micrometers, which implies that the electrically tunable reflected light would be in the infrared region. This functionality makes it possible to use the invention in applications such as smart windows, communications and beam steering. The materials suitable for the described electrically tunable selective reflection/diffraction typically have bend elastic constant $K_3$ much smaller than twist constant $K_2$. The LC materials 100, 200 may include the molecular dimer 1″,7″-bis(4-cyanobiphenyl-4′-yl)heptane (NC($C_6H_4$)$_2$($CH_2$)$_7$($C_6H_4$)$_2$CN (CB7CB) (or like materials) doped with an amount of chiral dopant. In one embodiment, the amount of chiral dopant includes between 1 and 5 wt % of chiral (left-handed) dopant S811. As further illustrative examples, the molecular dimers may be α,ω-bis(4,4-cyanobiphenyl) nonane (CB9CB) and/or 1,11-di-(1″-cyanobiphenyl-4-yl) undecane (CB11CB), optionally mixed with monomers such as pentylcyanobiphenyle (5CB), heptylcyanobiphenyle (7CB), 4-Cyano-4-N-Pentyl-P-Terphehyl (5CT), and octulcyanobiphenyle (8CB). The chiral dopant may, for example, include one or more of the commercially available chiral dopants R811, CB15, R1011, S1011, or BDH-1281.

Figure 3:
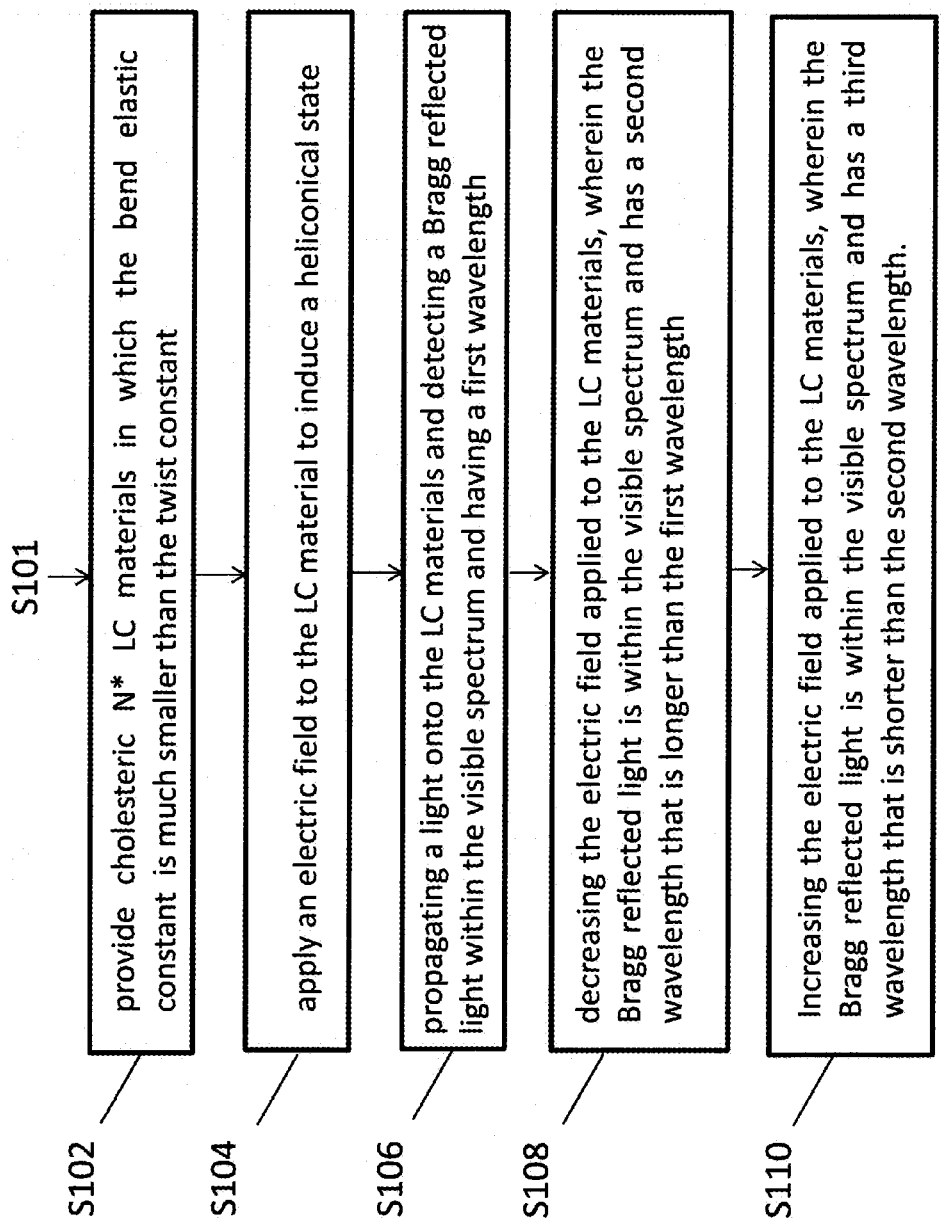
FIG. 3 is a flow diagram illustrating a method for electrically induced control of color reflections in a chiral nematic liquid crystal with oblique heliconical director.

With reference to FIG. 3, a method S100 for controlling color in the liquid crystal device of FIG. 2 starts at S101.

At S102, a liquid crystal material is provided which is chiral nematic at low (or zero) electrical bias, and in which the bend elastic constant $K_3$ is much smaller than the twist constant $K_2$.

At S104, an electric field is applied to the LC material at a field strength effective to induce a "heliconical" state in which the director forms an oblique helicoid with its axis oriented parallel with the electric field $E_{NC}$.

When the applied electric field is very high, the director of the N* is parallel to the applied electric field, n̂=(1,0,0), because dielectric anisotropy of the N*$\in_a$>0. Suppose now that the field is reduced, so that the tendency to twist caused by chiral nature of molecules, can compete with the dielectric torque. Below some threshold field, $$E_{NC} = \frac{2\pi}{P_0} \frac{K_2}{\sqrt{\varepsilon_0 \varepsilon_a K_3}},$$

the unwound nematic state transforms into a "heliconical" state in which the director follows an oblique helicoid, n̂=(cos θ, sin θ cos φ, sin θ sin φ) with the conical angle θ>0 and the angle of homogeneous azimuthal rotation φ(x)=2πx/P, where the heliconical pitch P is inversely proportional to the field:

$$P = \frac{2\pi}{E} \sqrt{\frac{K_3}{\varepsilon_0 \varepsilon_a}} \quad \text{(EQN. 1)}$$

and the conical angle δ related to the field:

$$\sin^2\theta = \frac{\kappa}{1-\kappa}\left(\frac{E_c}{\sqrt{\kappa} E} - 1\right) \quad \text{(EQN. 2)}$$

where $\kappa = K_3/K_2$ and $E_c = \frac{2\pi}{P_0}\sqrt{\frac{K_2}{\varepsilon_0 \varepsilon_a}}$ and $P_0$ is the pitch of the N* phase, $\in_a$, is the dielectric anisotropy and $\in_0$ is the vacuum permittivity.

At S106, a light is propagated onto the LC materials and a Bragg reflected light is within the visible light spectrum and has a first wavelength.

The center wavelength for the Bragg reflection reads $$\lambda_p = \bar{n} P \quad \text{(EQN. 3)}$$

with the reflection bandwidth $$\Delta\lambda = \Delta n_{eff} P \quad \text{(EQN. 4)}$$

where $\bar{n} = (n_e^{eff} + n_o)/2$ and $\Delta n = n_e^{eff} - n_o$ with $n_e^{eff} = \frac{n_e n_o}{\sqrt{n_e^2 \cos^2\theta + n_o^2 \sin^2\theta}}$.

At S108, the electric field applied to the LC materials is decreased, wherein the Bragg reflected light is within the visible spectrum and has a second wavelength that is longer than the first wavelength.

At S110, the electric field applied to the LC materials is increased, wherein the Bragg reflected light is within the visible spectrum and has a third wavelength that is shorter than the second wavelength. The spectral range is not limited by the visible spectrum and can be expanded to ultraviolet and infrared by an appropriate chemical composition, in particular, concentration of chiral dopants and by values of the applied electric field.

Further disclosure is provided in the form of the following examples. The examples provided are merely representative of the work that contributes to the teaching of the present disclosure.

Example 1: Preparing in-Plane LC Cell for Diffraction Grating Application of Cholesteric LCs with Oblique Heliconical Director An LC dimer material 1″,7″-bis(4-cyanobiphenyl-4′-yl) heptane (NC($C_6H_4$)$_2$($CH_2$)$_7$($C_6H_4$)$_2$CN, CB7CB) was used which shows a uniaxial N phase with a positive dielectric anisotropy, sandwiched between the isotropic and the twist-bend nematic phase $N_{tb}$. See V. Borshch et al., Nature Communications 4, 2635 (2013); D. Chen et al., Proceedings of the National Academy of Sciences of the United States of America 110, 15931 (2013). The dielectric permittivities were measured parallel and perpendicular to the director as $\in_\parallel$=7.3 and $\in_\perp$=5.9, respectively; the elastic constants were determined by the Frederiks transition technique to be $K_1$=5.7 pN and $K_2$=2.6 pN. See P. G. de Gennes and J. Prost, *The Physics of Liquid Crystals* (Clarendon Press, Oxford, 1993). All data corresponds to 106° C. To prepare the N* phase, CB7CB was doped with a small amount (1 wt %) of chiral (left-handed) dopant S811. The phase diagram is different from the case of an un-doped CB7CB: N* melts into an isotropic fluid at $T_{N*1}$=112° C. and transforms into a homochiral version of $N_{tb}$ at T*=99° C. The pitch $P_0$ of the N* phase, measured in the Grandjean-Cano wedge, decreases from 8.8 μm at T*1° C. to 6.2 μm at $T_{N*1}$−1° C. The electro-optic experiments were performed at the temperature T*+3° C., at which $P_0$=(7.5±0.5) μm.

Flat glass cells of thickness d=(11-16) μm were used. The glass substrates were coated with polyimide PI2555 that sets a homeotropic (perpendicular) orientation of the molecules. When the cell is filled with N*, it shows a fingerprint texture with the helicoid axis in the plane (x,y) of the cell. This geometry allows one to clearly visualize the periodic structure of both the heliconical and cholesteric structures, as the wave-vector of director modulations in both cases is confined to the plane (x, y). To assure a uniform alignment of the helicoid, the polyimide coatings were rubbed unidirectionally along the axis x.

For the polarizing optical microscopy (POM) study, two aluminum foil electrodes were placed between the glass plates to apply the electric field parallel to the rubbing direction x. This geometry corresponds to the diffraction grating device geometry described with reference to FIG. 1. The distance between the electrodes was 140 µm. For optical diffraction and optical retardance mapping by PolScope (See M. Shribak and R. Oldenbourg, Applied Optics 42, 3009 (2003)), the cells with patterned indium tin oxide (ITO) electrodes on one of the substrates were used, and the distance between the electrodes was L=100 µm. The AC field of frequency 3 kHz was used to explore the scenarios of structural transformations of the N* cells. Because of the cell geometry and in-plane arrangement of the electrodes, the electric field is inhomogeneous, being somewhat larger near the electrodes.

To establish the spatial pattern of the electric field, COMSOL Multiphysics finite-element based solver was employed. The simulations show that in the central part of the cell, the field is uniform and horizontal in the middle of the cell. For example, for the ITO case, for the applied voltage U=100 V, the field is 0.7 V/µm with a 5% accuracy in the range −20 µm×20 µm and across the entire extension of the LC slab along the z-direction. The field acting in the center of the cell can be calculated as $E=\beta U/L$, where $\beta$ is the correction coefficient, determined by numerical simulations to be 0.67 for ITO and 0.75 for aluminum electrodes.

Figure 4:
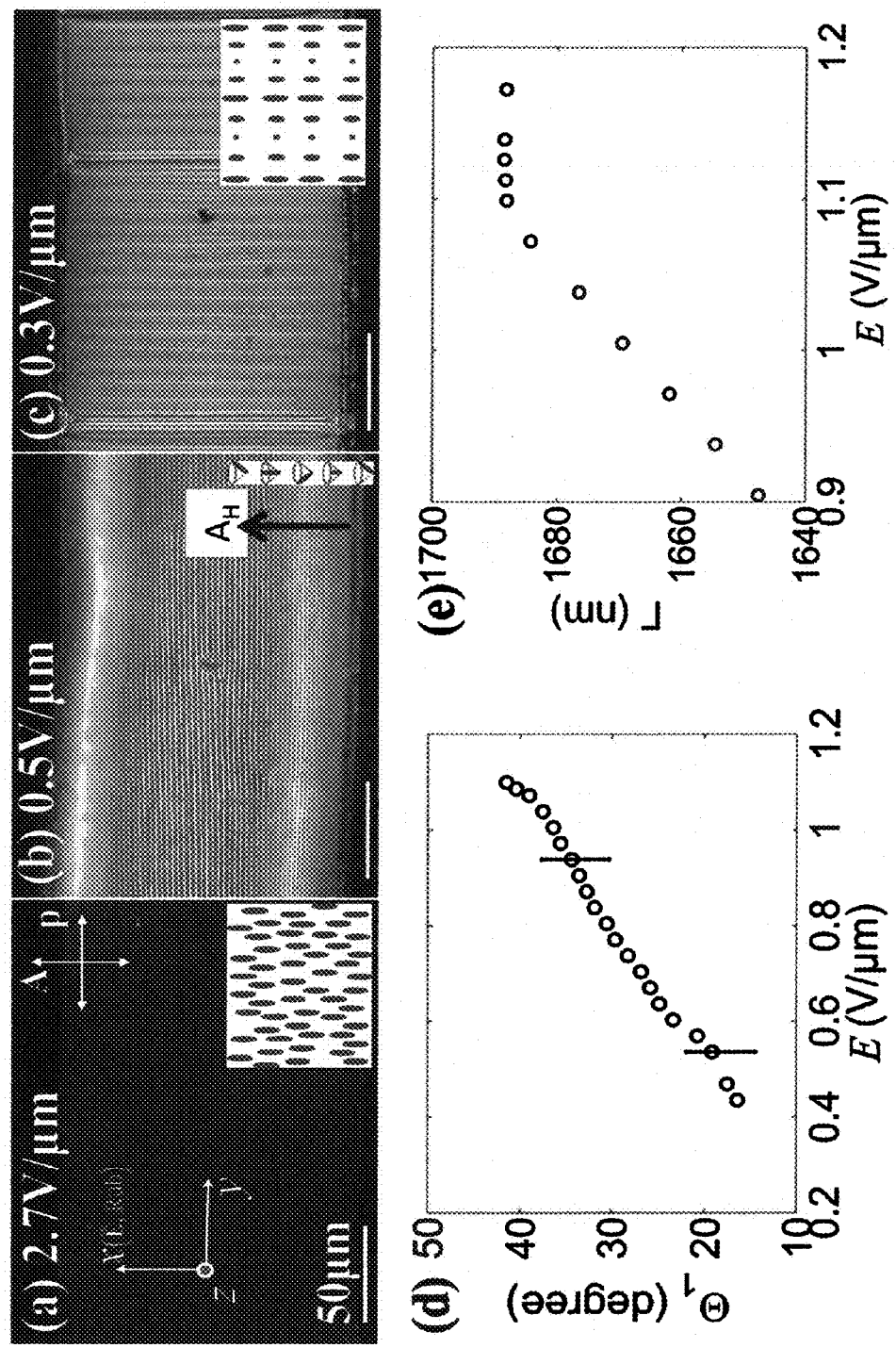
FIG. 4 is a set of micrographs and graphs showing the deformation of a chiral nematic liquid crystal in response to electric field.
Figure 5:
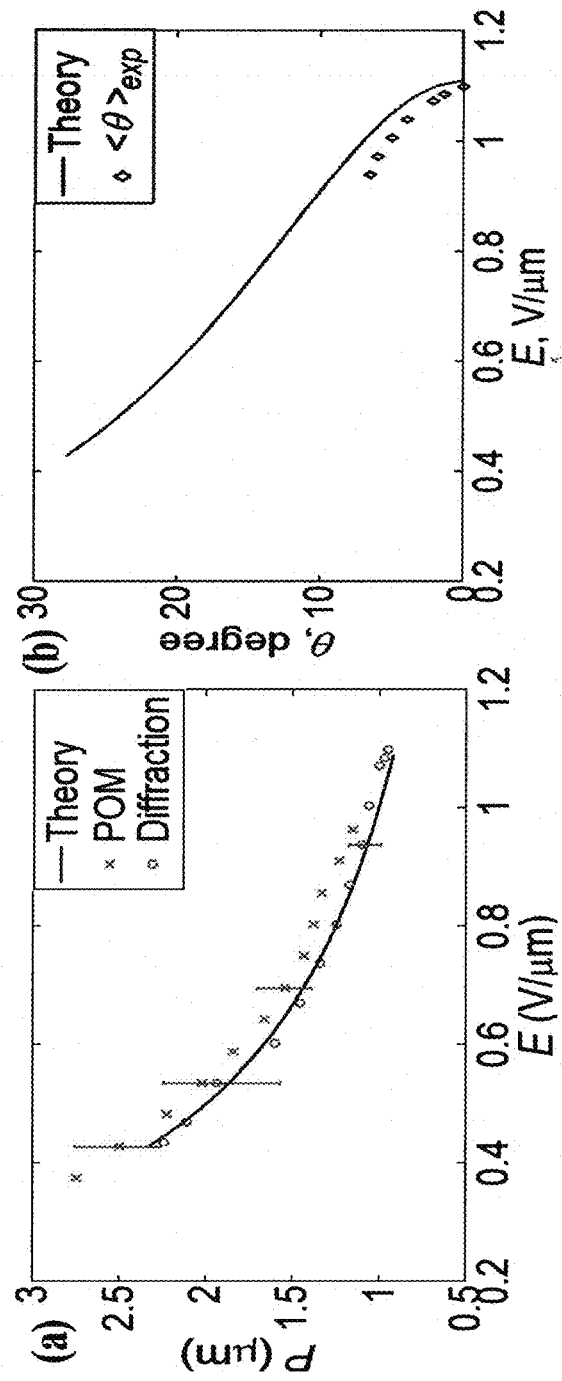
FIG. 5 is a pair of graphs showing electric field dependence of FIG. 5(a) heliconical pitch and FIG. 5(b) conical angle, as deduced from theory, Polarization Optical Microscopy (POM) experiments, and optical diffraction experiments.

FIG. 4 shows a polarizing optical microscopy (POM) experiment, where P (along the y direction) and A (along the x direction) indicate the POM polarizer and analyzer orientations (also called "crossed polarizers"). The experiment started with the application of a high electric field E applied along the x-direction, 4 V/µm, at which the helical structure of N* is completely unwound with $\hat{n}\|E$ (except possibly in narrow regions near the glass plates because of the homeotropic anchoring). With reference to FIG. 4(*a*), no periodic modulations are shown at this point. The texture is dark when viewed between two crossed polarizers, one of which (analyzer A) is parallel to E. With reference to FIG. 5(*b*), when the electric field is slowly decreased, the texture starts to brighten at $E_{NC}=(1.1\pm0.07)$ V/µm, showing a periodic modulation along the x-axis. This indicates the transition to the heliconical state. With reference to FIG. 5(*a*), the heliconical period (shown in µm) increases with the decrease of the electric field (shown in V/µm). The effect is not transient, as for a fixed field, the structure relaxes to feature a well-defined period. Adjustment of the period to the varied electric field is achieved by nucleation and propagation of edge dislocations of Burgers vector equal to the single period of the structure. With reference to FIG. 4(*c*), as the field is decreased further, at some other threshold $E_{N^*C}=(0.35\pm0.07)$ V/µm, the structure changes completely, by nucleating regions with the wave-vector of periodic modulation that is perpendicular to E. The new structure is a chiral nematic state with the (right-angle) helical axis now oriented transverse to the direction of the electrical field E (along the y direction for the illustrated coordinates). The helical axis also has a much larger period of about 9 µm, which decreases as the electric field becomes smaller.

The described scenario illustrated by FIGS. 4(*a-c*) corresponds to the transition from the nematic (FIG. 4(*a*)) to oblique helicoid structure (FIG. 4(*b*)) at $E_{NC}$, with a subsequent oblique-to-right angle helicoid first-order transformation (FIG. 4(*c*)) with axis reorientation at $E_{N^*C}<E_{NC}$. To demonstrate the oblique helicoidal state in the range $E_{N^*C}<E<E_{NC}$, an optical diffraction method and PolScope were used.

Example 2: Optical Diffraction Method and PolScope—in-Plane LC Cell Diffraction Grating Application of Cholesteric LCs An optical diffraction experiment was performed with a He—Ne laser beam ($\lambda=633$ nm) directed normally to the cell. Polarization of incident light was varied by a rotating polarizer. The diffraction pattern was projected onto a screen 9.5 cm away from the sample. The heliconical state is a polarization-sensitive phase diffraction grating. For normal incidence, the diffraction condition is given by Bragg's law, $m\lambda=P \sin \Theta_m$, where m is the diffraction order, $\Theta_m$ is the corresponding diffraction angle. For small cone angles 9, the first-order diffraction intensity $\propto \sin^2 2\theta$ is expected to be higher than the second-order diffraction intensity $\propto \sin^4 \theta$. This is indeed the case, as the values of P calculated from the field dependence of $\Theta_1$, see FIG. 4(*d*), match the POM data very well, see FIG. 5(*a*).

With reference to FIG. 5(*a*), the field dependence P(E) follows closely the theoretically expected behavior $P \propto 1/E$, which allows one to extract an important information on the elastic constants of N*. See R. B. MEYER, Applied Physics Letters 12, 281 (1968). According to Eq. (2), $\kappa=EP/E_{NC}P_0$, which yields $\kappa=K_3/K_2\approx0.12$ with the experimental data on P(E) $E_{NC}$ and $P_0=7.5$ µm. The smallness of $\kappa$ satisfies the restrictions imposed by Meyer-de Gennes theory. See P. G. de Gennes and J. Prost, *The Physics of Liquid Crystals* (Clarendon Press, Oxford, 1993); R. B. MEYER, Applied Physics Letters 12, 281 (1968). Moreover, the experimental $E_{N^*C}=(0.35\pm0.07)$ V/µm agrees with the value $E_{N^*C}=0.39$ V/µm obtained from Eq. (4) when $\kappa=0.12$. The twist modulus is independently calculated from the definition of $E_{NC}$ as $$K_2 = \varepsilon_0 \varepsilon_a \kappa \left(\frac{P_0 E_{NC}}{2\pi}\right)^2 = 2.6 \text{ pN},$$

the same as measured in the N phase 106° C. With the above data, one deduces a rather small value of the bend elastic constant in N*, $K_3=0.3$ pN.

PolScope was used to characterize the oblique helicoid when the cone angle $\theta$ is small. PolScope maps the optical retardance $\Gamma(x,y)$ of the sample, $\Gamma=\int \Delta n_{eff} dz$, where $\Delta n_{eff}$ is the effective birefringence of the heliconical state. For a small $\theta$, one can use an approximation $$\Delta n_{eff} \approx \Delta n \left(1 - \frac{3}{2}\sin^2\theta\right),$$

where $\Delta n$ is the birefringence of the unwound $\hat{n}=(1,0,0)$ state. As a measure of $\Delta n$, the experimentally determined birefringence of pure CB7CB was used, $\Delta n=0.15$ at 106° C. With reference to FIG. 4(*e*), this value yields $\Gamma=1690$ nm for the unwound state in the cell of thickness $d=11.2$ µm. When the field is reduced, the nematic-to-oblique helicoid transition is manifested by a cusp in the dependency $\Gamma(E)$ followed by a decrease of $\Gamma$. Such a behavior is expected because of the departure of $\theta$ from its zero value at $E \leq E_{NC}$ (See Eqn. (3)).

Example 3: Preparing Top-Down LC Cell for Color Tuning Application of Cholesteric LCs with Oblique Heliconical Director To demonstrate the color tuning application of heliconical structure, a doped LC dimer material CB7CB with a small amount (4.9 wt %) of chiral dopant S811 was used. The phase diagram is different from the case of an undoped CB7CB: N* melts into an isotropic fluid at 101.5° C. and transforms into a homochiral version of $N_{tb}$ at T*=90 C. The electrooptic experiments were performed at the temperature T*+3 C.

To explore the electrooptic response of N* cell, a flat glass cell of thickness d=50 µm was used. The glass substrates were coated with polyimide PI2555 that sets a homeotropic (perpendicular) orientation of the molecules. When the cell is filled with N*, it shows a fingerprint texture with the helicoid axis in the plane (x, y) of the cell. To assure a uniform alignment of the helicoid, the polyimide coatings were rubbed unidirectionally along the axis x. The AC field of frequency 3 kHz was used to explore the electrooptic properties of heliconical structure of the N* cells. The LC cell geometry corresponds to that described with reference to FIG. 2, in which the electric field is applied transverse to the planar substrates.

Due to the helicoid character of the heliconical structure, it exhibits a Bragg reflection property. The center wavelength for the Bragg reflection reads $$\lambda_p = \bar{n} P \quad \text{(EQN. 5)}$$

with the reflection bandwidth $$\Delta \lambda = \Delta n_{eff} P \quad \text{(EQN. 6)}$$

where $\bar{n} = (n_e^{eff} + n_o)/2$ and $\Delta n = n_e^{eff} - n_o$ with $n_e^{eff} = \dfrac{n_e n_o}{\sqrt{n_e^2 \cos^2\theta + n_o^2 \sin^2\theta}}$.

Figure 6:
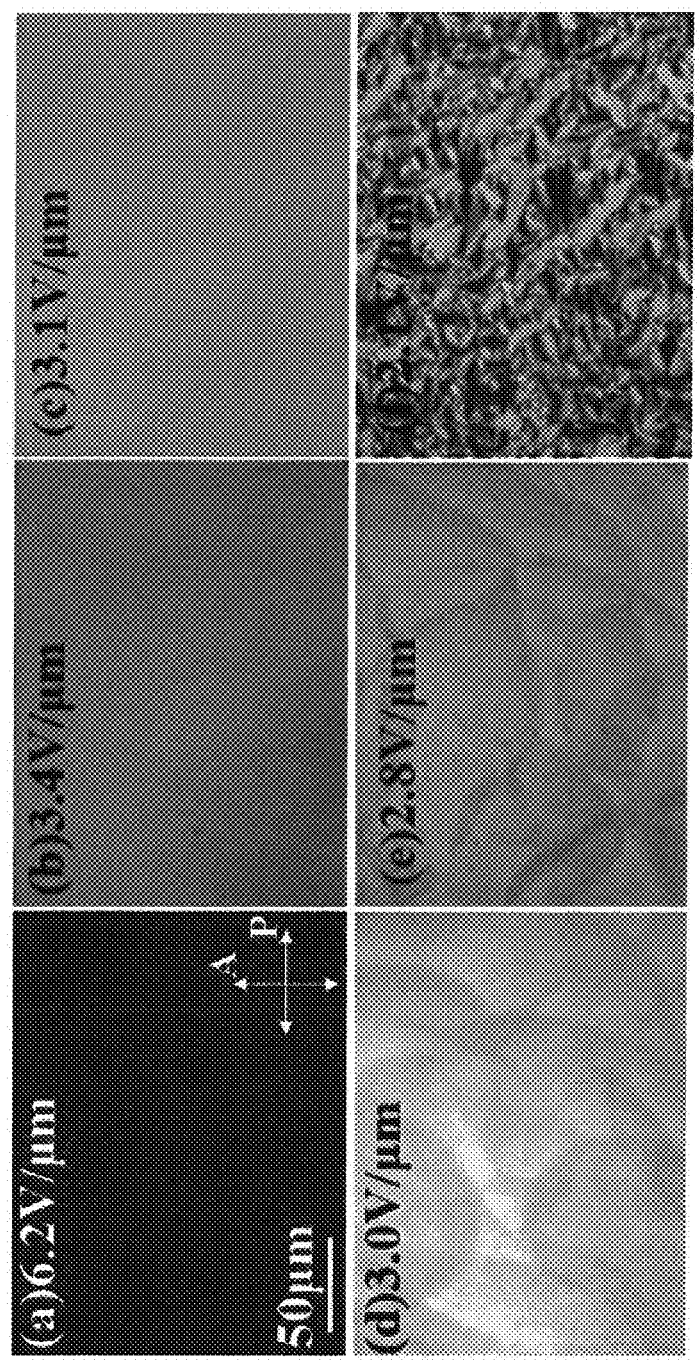
FIG. 6 is set of micrographs showing electric-field induced heliconical state with the director following predominantly an oblique helicoid with the axis along the electric field under the polarizing optical microscope. Field induced FIG. 6(a) homeotropic state, FIG. 6(b-e) heliconical state, FIG. 6(f) focal conic state. All scale bars are 50 μm.

With reference to FIG. 6, the homeotropic state is shown in FIG. 6(a). For a decrease in the field strength sufficient to transition to the heliconical state, the color of the scattered light from the cell is shifted from blue (3.4 V/µm), as shown at FIG. 6(b), to green (3.1 V/µm), as shown at FIGS. 6(c and d), and then to red (2.8 V/µm), as shown at FIG. 6(e). When the field is below 2.6 V/µm, the material is in the N* focal conic state. With reference to FIG. 6(e), the N* focal conic state is shown at 2.1 V/µm. At high field (above 6.2 V/µm), a homeotropic state is obtained (FIG. 6(a)), which appears transparent to the naked eye, and all selective reflection disappears.

Figure 7:
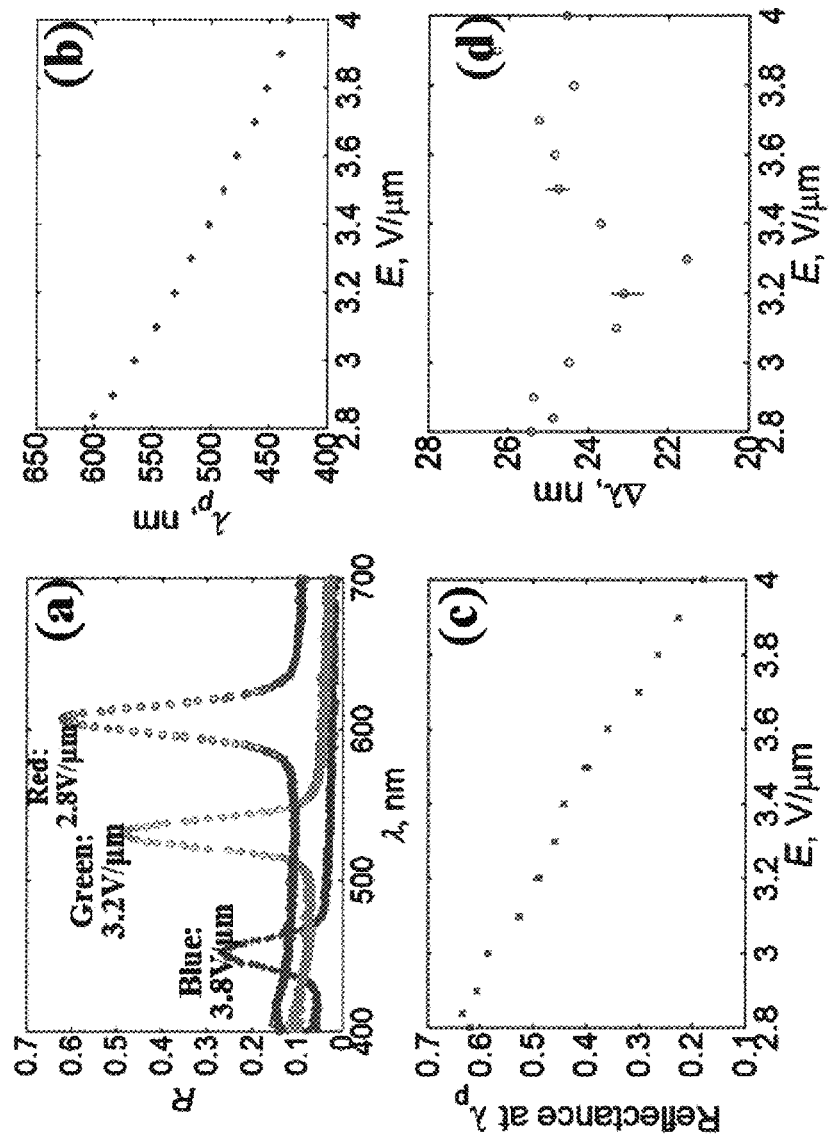
FIG. 7 is set of reflection spectrum graphs showing in FIG. 7(a) the reflection spectrum of the N* cell at different applied electric fields, in FIG. 7(b) the wavelength of the reflection peak as a function of the applied electric field, in FIG. 7(c) the reflectance of the reflection peak as a function of the applied field, and in FIG. 7(d) the bandwidth of the reflection peak as a function of the applied field.

With reference to FIG. 7, the spectral properties vary with the applied electric field strength. FIG. 7(a) shows the measured reflection spectra of the cell for three different field strengths corresponding to blue, green, and red reflected lights. These measurements were carried out with the normally incident non-polarized light. With reference to FIGS. 7(a and b), as the field strength continues to decrease, the peak wavelength shifts to the red region of the visible spectrum. This is mainly because the pitch of the heliconical structure increases with the decrease of the electric field per EQN. (1). As θ increases with decreasing the field, per EQN. (2), $n_e^{eff}$ becomes bigger while $n_o$ remains the same. Therefore the effective birefringence $\Delta n_{eff} = n_e^{eff} - n_o$ increases as decreasing the electric field. With reference to FIG. 7(c), this results in the peak reflectance increasing with a decrease in the applied electric field. The peak reflectance can be further increased by using a thick cell. The reflection band almost unchanged when changing the field, FIG. 7(d), which can be explained by the non-ideal helix due to the boundary conditions, pitch variation and helix tilting due to the edge dislocations in the bulk. See L. M. Blinov, Electro-optical and magneto-optical properties of liquid crystals (Wiley, 1983).

Figure 8:
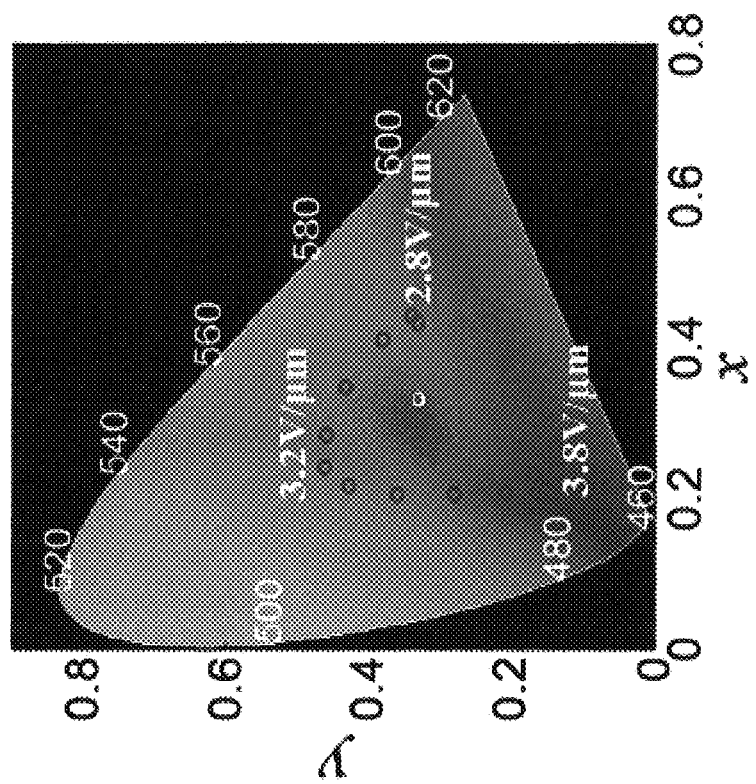
FIG. 8 is a CIE1931 chromaticity diagram 2° viewing angle of reflection wavelength of electrically switchable heliconical structure in cholesteric liquid crystals. Blue circles show the color coordinates of the reflected color under different electric fields, and the white open circle corresponds to the white chromaticity.

Example 4: Chromaticity Diagram—Top-Down LC Cell for Color Tuning Application of Cholesteric LCs with Oblique Heliconical Director The chromatic sensation of human eyes to a specific optical spectrum is usually characterized by a chromaticity diagram. In what follows, we use the CIE1931 2° basis with D65 illuminant to characterized the colorimeters of the heliconical structure of N* samples. Each circle corresponds to the reflection color obtained from heliconical structure under the applied electric field. With reference to FIG. 8, the electrically switchable colors follow a clockwise fashion with the increase in applied field.

Example 5: Response Time Measurement—Top-Down LC Cell for Color Tuning Application of Cholesteric LCs with Oblique Heliconical Director With reference to FIG. 9, the characteristic times of color tuning were determined by recording the change of light transmittance through the cell and determining the levels of 10% and 90% of the maximum transmittance. In order to obtain the response time between two heliconical states, a drive scheme has been conceived as depicted in FIG. 9 (a).

Figure 9:
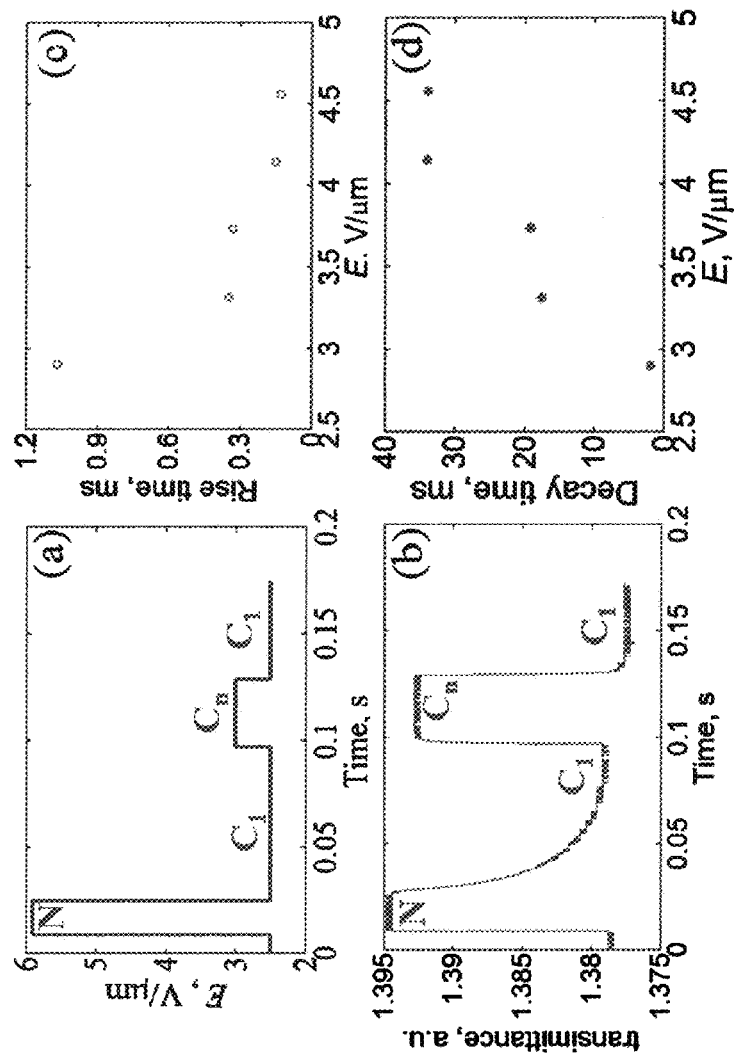
FIG. 9 is a set of graphs representing the electro-optic response of heliconical states.

With reference to FIG. 9(a), all electric fields are RMS value with square wave form of frequency 50 kHz. A high field (5.9 V/µm) was first applied to achieve the nematic state (N). This field was then reduced to a low value (2.5 V/µm) to have a base heliconical state ($C_1$). The field was then increased (2.5V/µm<E<5V/µm) to have another heliconical state ($C_n$). The field was then reduced to a low value again to return to the base heliconical state ($C_1$). Using this scheme, the response time between two heliconical states can be measured. With reference to FIGS. 9(c and d), the switch on $\tau_{on}$ times are in the submillisecond range and switch off $\tau_{off}$ times are in the millisecond range. Higher fields are shown for the higher field heliconical state, smaller switch-on time, and also larger switch-off time.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A diffraction grating device, comprising:
a liquid crystal (LC) cell including two substrates, a cholesteric liquid crystal material disposed within the liquid crystal cell between the substrates, and two electrodes, the electrodes disposed on the substrates and configured to apply an electric field through the cholesteric liquid crystal material disposed within the liquid crystal cell;
a power generator for generating the applied electric field, the power generator configured to vary the strength of the applied electric field to produce a diffracted light from the cholesteric liquid crystal material within the visible spectrum;
wherein the applied electric field induces the cholesteric liquid crystal material into a heliconical state including an oblique helicoid director.

2. The diffracting grating device according to claim 1, wherein the cholesteric liquid material includes 1",7"-bis(4-cyanobiphenyl-4'-yl)heptane $(NC(C_6H_4)_2(CH_2)_7(C_6H_4)_2CN$ (CB7CB) and between 1 and 5 wt % of chiral dopant.

3. The diffracting grating device according to claim 1, wherein the cholesteric liquid material includes a molecular dimer mixed with a chiral dopant.

4. The diffracting grating device according to claim 3, wherein the molecular dimer comprises one or more of:
1",7"-bis(4-cyanobiphenyl-4'-yl)heptane $(NC(C_6H_4)_2(CH_2)_7(C_6H_4)_2CN$ (CB7CB),
α,ω-bis(4,4-cyanobiphenyl)nonane (CB9CB), and
1,11-di-(1"-cyanobiphenyl-4-yl)undecane (CB11CB).

5. The diffracting grating device according to claim 3, wherein the cholesteric liquid material further includes one or more monomers selected from the group consisting of pentylcyanobiphenyle (5CB), heptylcyanobiphenyle (7CB), 4-Cyano-4-N-Pentyl-P-Terphenyl(5CT), and octulcyanobiphenyle (8CB).

6. The diffracting grating device according to claim 1, wherein:
the electrodes have an in-plane geometry generating an applied electric field in the plane of the substrates, and
the applied electric field in the plane of the substrates induces the cholesteric liquid crystal material into the heliconical state including the oblique helicoid director whose helicoid axis is oriented in the plane of the substrates.

7. A device for color tuning, comprising:
a liquid crystal (LC) cell including two substrates, a cholesteric liquid crystal material disposed within the liquid crystal cell between the substrates, and two electrodes, the electrodes disposed on the substrates and configured to apply an electric field through the cholesteric liquid crystal material disposed within the liquid crystal cell;
a power generator for generating the applied electric field, the power generator configured to vary the strength of the applied electric field to produce a reflected light from the cholesteric liquid crystal material within the visible spectrum;
wherein the applied electric field induces the cholesteric liquid crystal material into a heliconical state including an oblique helicoid director.

8. The device according to claim 7, wherein the applied electric field is approximately 3.4 V/μm and the reflected light appears blue in color.

9. The device according to claim 7, wherein the applied electric field induces the cholesteric liquid crystal material into the heliconical state including the oblique helicoid director with a helicoid pitch effective to cause the reflected light to have a wavelength between approximately 400 nm and 700 nm.

10. An electrooptic device comprising:
a liquid crystal cell including spaced apart substrates defining a gap between the substrates and electrodes having one of (i) an in-plane geometry generating an electric field parallel with the substrates and (ii) a top-down geometry generating an electric field across the gap between the two spaced apart substrates;
a liquid crystal material disposed in the gap between the substrates and comprising a chiral nematic material formed by a mixture of molecular dimers and chiral dopant;
wherein the liquid crystal within an operational range of electric field applied by the electrodes exhibits an $N_{oh}^*$ state with an oblique angle helicoid director whose helicoid axis is oriented parallel with the electric field and whose helicoid pitch is sized to provide diffraction or Bragg reflection of light in a spectral range of interest impinging on one of the substrates of the liquid crystal cell.

11. The electrooptic device of claim 10 wherein the spectral range of interest is in the visible spectrum, ultraviolet spectrum, and/or infrared spectrum.

12. The electrooptic device of claim 10 wherein:
the electrodes have an in-plane geometry generating an electric field parallel with the substrates, and
the liquid crystal within the operational range of electric field applied by the electrodes exhibits the $N_{oh}^*$ state with the oblique angle helicoid director whose helicoid axis is oriented parallel with the substrates and whose helicoid pitch is sized to provide diffraction of light in the spectral range of interest impinging on one of the substrates of the liquid crystal cell.

13. The electrooptic device of claim 10 wherein:
the electrodes have a top-down geometry generating an electric field across the gap between the two spaced apart substrates, and
the liquid crystal within the operational range of electric field applied by the electrodes exhibits the $N_{oh}^*$ state with the oblique angle helicoid director whose helicoid axis is oriented transverse to the substrate and whose helicoid pitch is sized to provide Bragg reflection of light in the spectral range of interest impinging on one of the substrates of the liquid crystal cell.

14. The electrooptic device of claim 10 wherein the molecular dimers comprise one or more of:
1",7"-bis(4-cyanobiphenyl-4'-yl)heptane $(NC(C_6H_4)_2(CH_2)_7(C_6H_4)_2CN$ (CB7CB),
α,ω-bis(4,4-cyanobiphenyl)nonane (CB9CB), and
1,11-di-(1"-cyanobiphenyl-4-yl)undecane (CB11CB).

15. The electrooptic device of claim 10 wherein the chiral nematic material is formed by a mixture of molecular dimers, chiral dopant, and one or more monomers selected from the group consisting of pentylcyanobiphenyle (5CB), heptylcyanobiphenyle (7CB), 4-Cyano-4-N-Pentyl-P-Terphenyl (5CT), and octulcyanobiphenyle (8CB).

16. The electrooptic device of claim 10 wherein the liquid crystal material has bend elastic constant $K_3$ that is smaller than twist constant $K_2$.

17. The electrooptic device of claim 10 wherein:
the liquid crystal within a lower non-operational range of electric field applied by the electrodes exhibits a chiral nematic (N*) state whose director has a right angle helix with its helical axis oriented transverse to the electric field;

wherein the lower non-operational range of electric field is lower than the operational range of electric field.

18. The electrooptic device of claim 17 wherein:

the liquid crystal within a higher non-operational range of electric field applied by the electrodes exhibits a homeotropic state whose director is oriented parallel with the electric field;

wherein the higher non-operational range of electric field is higher than the operational range of electric field.

19. A method comprising:

applying a voltage across the electrodes of an electrooptic device as set forth in claim 10 to generate an electric field within the operational range and tuned so that the electrooptic device provides diffraction or Bragg reflection of light at a center wavelength within the spectral range of interest impinging on one of the substrates of the liquid crystal cell.

20. The method of claim 19 further comprising:

impinging light at the center wavelength on said one of the substrates of the liquid crystal cell.

* * * * *

UNITED STATES PATENT AND TRADEMARK OFFICE
CERTIFICATE OF CORRECTION

PATENT NO. : 9,690,161 B2
APPLICATION NO. : 14/812397
DATED : June 27, 2017
INVENTOR(S) : Oleg D. Lavrentovich et al.

It is certified that error appears in the above-identified patent and that said Letters Patent is hereby corrected as shown below:

On the Title Page

Item (72) should appear as follows:
Oleg D. Lavrentovich, Kent, OH (US); Sergij V. Shiyanovskii, Stow, OH (US); Jie Xiang, Kent, OH (US); Young-Ki Kim, Kent, OH (US)

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*